(12) United States Patent
Rambo et al.

(10) Patent No.: US 11,946,415 B2
(45) Date of Patent: Apr. 2, 2024

(54) WASTE HEAT RECOVERY SYSTEM

(71) Applicant: General Electric Company, Schenectady, NY (US)

(72) Inventors: Jeffrey Douglas Rambo, Mason, OH (US); Brandon Wayne Miller, Liberty Township, OH (US); William Joseph Bowden, Cleves, OH (US); Matthew Thomas Beyer, Hartland, WI (US); Michael John Simonetti, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/470,032

(22) Filed: Sep. 9, 2021

(65) Prior Publication Data
US 2023/0076757 A1    Mar. 9, 2023

(51) Int. Cl.
*F02C 7/10*    (2006.01)

(52) U.S. Cl.
CPC ............ *F02C 7/10* (2013.01); *F05D 2220/32* (2013.01); *F05D 2260/213* (2013.01)

(58) Field of Classification Search
CPC .... F02C 7/08; F02C 7/10; F02C 7/224; F02C 7/141; F01D 25/30; F05D 2260/213
See application file for complete search history.

(56) References Cited

U.S. PATENT DOCUMENTS

| | | | | |
|---|---|---|---|---|
| 2,516,910 A | * | 8/1950 | Redding | F02C 7/08 60/39.511 |
| 3,116,604 A | * | 1/1964 | Holl | F02C 7/08 165/125 |
| 3,201,938 A | * | 8/1965 | Zirin | F02C 7/08 165/142 |
| 3,222,864 A | * | 12/1965 | Dyste | F02C 7/08 60/39.511 |
| 3,267,673 A | * | 8/1966 | Hemsworth | F02C 7/08 60/39.511 |
| 3,730,644 A | * | 5/1973 | Jubb | F02C 7/10 416/244 R |
| 5,119,624 A | * | 6/1992 | McKenna | F02C 9/16 60/39.15 |
| 5,392,595 A | * | 2/1995 | Glickstein | F02C 6/18 60/39.12 |
| 7,254,937 B2 | * | 8/2007 | Hull | F02C 7/10 60/39.511 |
| 8,961,114 B2 | * | 2/2015 | Ruthemeyer | F28D 11/04 415/176 |
| 9,068,506 B2 | * | 6/2015 | Eleftheriou | F02C 7/08 |
| 9,395,122 B2 | * | 7/2016 | Eleftheriou | F28F 13/08 |
| 9,429,075 B2 | | 8/2016 | Amin et al. | |
| 9,435,258 B2 | * | 9/2016 | Janapaneedi | F02C 3/34 |

(Continued)

*Primary Examiner* — Alain Chau
(74) *Attorney, Agent, or Firm* — Dority & Manning, P.A.

(57) ABSTRACT

A gas turbine engine having a waste heat recovery system is provided. The gas turbine engine includes a compressor section, a combustion section, a turbine section, and an exhaust section in serial flow order and together defining a core air flowpath, the exhaust section including a primary exhaust flowpath and a waste heat recovery flowpath parallel to the primary exhaust flowpath; and the waste heat recovery system includes a heat source exchanger positioned in thermal communication with a first portion of the waste heat recovery flowpath.

12 Claims, 9 Drawing Sheets

(56) References Cited

U.S. PATENT DOCUMENTS

| | | | |
|---|---|---|---|
| 9,695,750 B2 * | 7/2017 | Wollenweber | F02C 9/40 |
| 9,766,019 B2 * | 9/2017 | Eleftheriou | F02C 7/143 |
| 10,260,371 B2 * | 4/2019 | Youssef | F01D 25/30 |
| 10,364,750 B2 * | 7/2019 | Rambo | F02K 3/115 |
| 10,683,804 B2 | 6/2020 | Descubes et al. | |
| 10,724,438 B2 * | 7/2020 | Macchia | F02C 7/10 |
| 10,941,706 B2 | 3/2021 | Sen et al. | |
| 11,125,165 B2 * | 9/2021 | Niergarth | F02C 7/14 |
| 11,187,156 B2 * | 11/2021 | Niergarth | B01D 19/0005 |
| 2013/0255268 A1 * | 10/2013 | Eleftheriou | F02C 7/08 60/39.511 |
| 2014/0102105 A1 * | 4/2014 | Janapaneedi | F02C 3/34 60/39.5 |
| 2014/0208766 A1 * | 7/2014 | Amin | F02C 7/26 60/778 |
| 2014/0360154 A1 * | 12/2014 | Benz | F02C 3/34 60/39.52 |
| 2015/0128608 A1 * | 5/2015 | Benz | F02C 3/34 60/39.52 |
| 2016/0369695 A1 * | 12/2016 | Perlak | F02C 7/08 |
| 2017/0335715 A1 * | 11/2017 | Youssef | F02C 6/08 |
| 2018/0313269 A1 * | 11/2018 | Macchia | F02C 7/10 |
| 2019/0128189 A1 * | 5/2019 | Rambo | F02K 3/115 |
| 2019/0153952 A1 * | 5/2019 | Niergarth | F02C 7/14 |
| 2019/0153953 A1 * | 5/2019 | Niergarth | F02C 7/224 |
| 2019/0186361 A1 * | 6/2019 | Gerstler | F02C 3/04 |
| 2019/0359340 A1 | 11/2019 | Pachidis et al. | |
| 2020/0088098 A1 | 3/2020 | Roberge | |
| 2020/0088099 A1 * | 3/2020 | Roberge | F02C 7/224 |
| 2020/0165974 A1 | 5/2020 | Smith et al. | |
| 2020/0165982 A1 | 5/2020 | Smith et al. | |
| 2020/0200085 A1 * | 6/2020 | Perlak | F02C 9/18 |
| 2020/0224557 A1 | 7/2020 | McAuliffe et al. | |
| 2020/0224588 A1 | 7/2020 | Somanath et al. | |
| 2020/0224589 A1 | 7/2020 | McAuliffe et al. | |
| 2020/0224590 A1 | 7/2020 | McAuliffe et al. | |
| 2021/0222619 A1 * | 7/2021 | Boucher | F02K 3/115 |
| 2021/0340914 A1 * | 11/2021 | Niergarth | F28F 23/00 |

\* cited by examiner

WASTE HEAT RECOVERY SYSTEM

FIELD

The present subject matter relates generally to a waste heat recovery system for a gas turbine engine and a method for operating the same.

BACKGROUND

A gas turbine engine typically includes a fan and a turbomachine. The turbomachine generally includes an inlet, one or more compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as for producing useful work to propel an aircraft in flight and/or to power a load, such as an electrical generator.

In at least certain embodiments, the turbomachine and fan are at least partially surrounded by an outer nacelle. With such embodiments, the outer nacelle defines a bypass airflow passage with the turbomachine. Additionally, the turbomachine is supported relative to the outer nacelle by one or more outlet guide vanes/struts.

During operation of the gas turbine engine, a relatively large amount of heat energy is generated through the compression process by the compressors and through the combustion process within the combustor. While a substantial portion of the heat energy is extracted through the one or more turbines, a portion of such heat energy is exhausted to atmosphere. Such may lead to a loss of efficiency of the gas turbine engine. Accordingly, a system and/or method for operating a gas turbine engine in a manner to increase an efficiency of the gas turbine engine, and reduce an amount of waste heat exhausted to atmosphere, would be useful.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION

Figure 1:
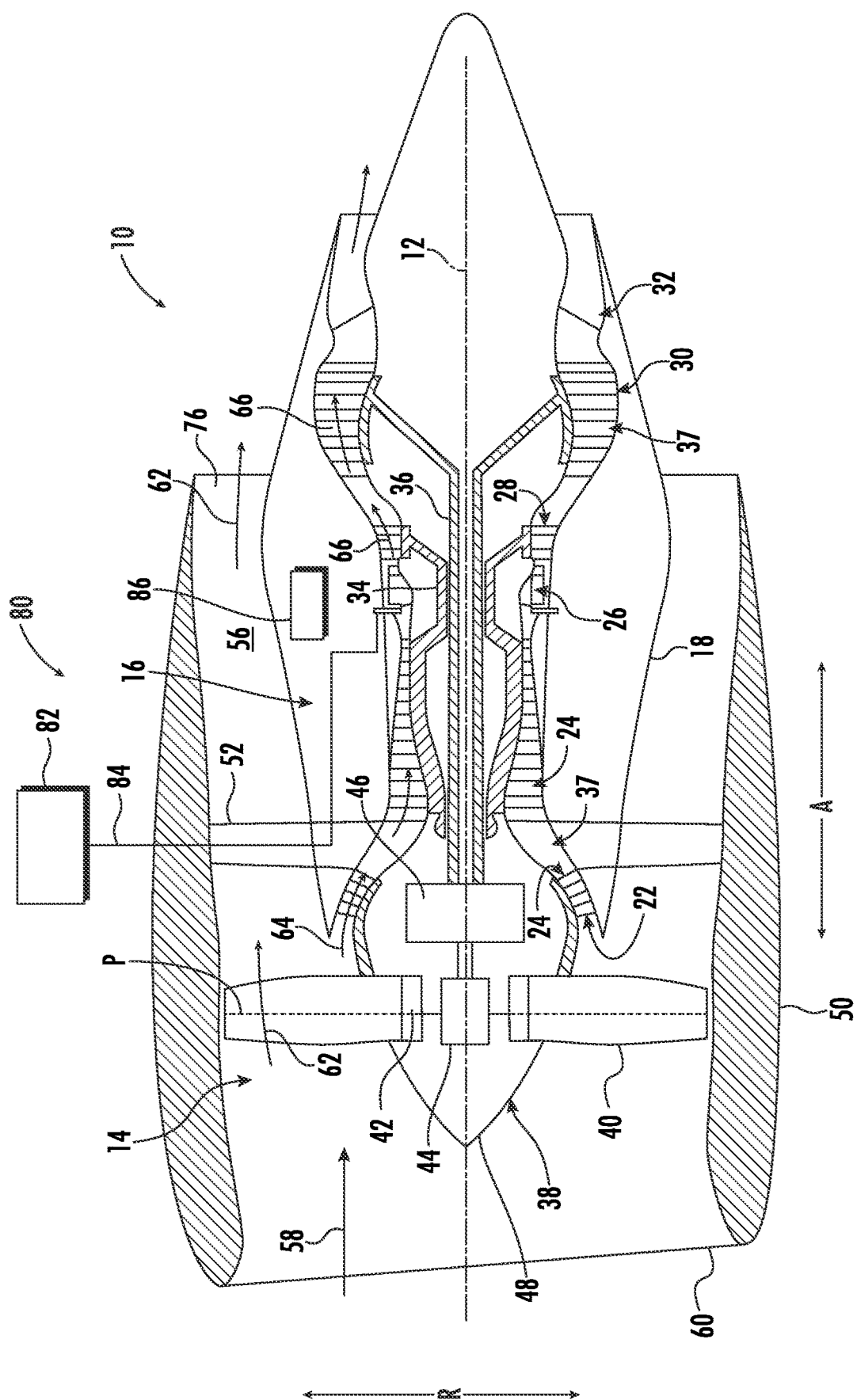
FIG. 1 is a schematic, cross-sectional view of an exemplary gas turbine engine according to various embodiments of the present subject matter.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The following description is provided to enable those skilled in the art to make and use the described embodiments contemplated for carrying out the disclosure. Various modifications, equivalents, variations, and alternatives, however, will remain readily apparent to those skilled in the art. Any and all such modifications, variations, equivalents, and alternatives are intended to fall within the scope of the present disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

For purposes of the description hereinafter, the terms "upper", "lower", "right", "left", "vertical", "horizontal", "top", "bottom", "lateral", "longitudinal", and derivatives thereof shall relate to the disclosure as it is oriented in the drawing figures. However, it is to be understood that the disclosure may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The present disclosure is generally related to an exhaust section of a gas turbine engine having a primary exhaust flowpath and a waste heat recovery flowpath parallel to the primary exhaust flowpath. The gas turbine engine of the present disclosure further includes a waste heat recovery system including a heat source exchanger positioned in thermal communication with a first portion of the waste heat recovery flowpath, such as positioned within the first portion of the waste heat recovery flowpath. Further, a first portion of an airflow that exits a turbine section of the gas turbine engine during operation of the gas turbine engine travels through the primary exhaust flowpath and a second portion of an airflow that exits the turbine section during operation of the gas turbine engine is directed to the waste heat recovery flowpath.

In this manner, a waste heat recovery pressure drop of the second portion of the airflow within the waste heat recovery flowpath may be greater than a primary exhaust pressure drop of the first portion of the airflow within the primary exhaust flowpath. For example, the present disclosure provides a more efficient waste heat recovery system capable of an allowable pressure drop through the heat source exchanger of approximately 5% by directing a parallel stream, e.g., the second portion of an airflow that exits the turbine section, to the waste heat recovery flowpath and through the heat source exchanger. This is not possible in conventional systems having a heat exchanger located within a primary exhaust flowpath which are limited to an allowable pressure drop through the heat exchanger of approximately 2% (e.g., for fuel efficiency and thrust generation purposes) with a full flow of airflow exiting the turbine section traveling therethrough.

It is contemplated that a waste heat recovery system of the present disclosure is capable of an allowable pressure drop through the heat source exchanger of approximately 0.1% to 25% by directing a parallel stream, e.g., the second portion of an airflow that exits the turbine section, to the waste heat recovery flowpath and through the heat source exchanger. It is further contemplated that a waste heat recovery system of the present disclosure is capable of an allowable pressure drop through the heat source exchanger of approximately 0.1% to 20% by directing a parallel stream, e.g., the second portion of an airflow that exits the turbine section, to the waste heat recovery flowpath and through the heat source exchanger. It is further contemplated that a waste heat recovery system of the present disclosure is capable of an allowable pressure drop through the heat source exchanger of approximately 0.1% to 15% by directing a parallel stream, e.g., the second portion of an airflow that exits the turbine section, to the waste heat recovery flowpath and through the heat source exchanger. It is further contemplated that a waste heat recovery system of the present disclosure is capable of an allowable pressure drop through the heat source exchanger of approximately 0.1% to 10% by directing a parallel stream, e.g., the second portion of an airflow that exits the turbine section, to the waste heat recovery flowpath and through the heat source exchanger. It is further contemplated that a waste heat recovery system of the present disclosure is capable of an allowable pressure drop through the heat source exchanger of approximately 0.1% to 8% by directing a parallel stream, e.g., the second portion of an airflow that exits the turbine section, to the waste heat recovery flowpath and through the heat source exchanger. It is contemplated that a waste heat recovery system of the present disclosure is capable of an allowable pressure drop through the heat source exchanger of approximately 0.1% to 6% by directing a parallel stream, e.g., the second portion of an airflow that exits the turbine section, to the waste heat recovery flowpath and through the heat source exchanger. It is also contemplated that a waste heat recovery system of the present disclosure is capable of an allowable pressure drop through the heat source exchanger of approximately 5% by directing a parallel stream, e.g., the second portion of an airflow that exits the turbine section, to the waste heat recovery flowpath and through the heat source exchanger.

Referring now to the drawings, wherein identical numerals indicate the same elements throughout the figures, FIG. 1 is a schematic, cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan engine 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section, also referred to herein as an exhaust section, 32. The compressor section, the combustion section 26, the turbine section, and the exhaust section 32 together define at least in part a core air flowpath 37 through the turbomachine 16. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from the disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, the disk 42, and the actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by a rotatable front hub 48 aerodynamically contoured to promote an airflow through the plurality of fan blades 40. Additionally, the exemplary fan section 14 includes an annular fan casing or outer nacelle 50 that circumferentially surrounds the variable pitch fan 38 and/or at least a portion of the turbomachine 16. The outer nacelle 50 is supported relative to the turbomachine 16 by a plurality of circumferentially-spaced outlet guide vanes 52. Moreover, the outer nacelle 50 extends over an outer portion of the turbomachine 16 so as to define a bypass airflow passage 56 therebetween.

During operation of the turbofan engine 10, a volume of air 58 enters the turbofan engine 10 through an associated inlet 60 of the outer nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio.

The pressure of the second portion of air 64 is then increased as it is routed through the high pressure (HP) compressor 24 and into the combustion section 26, where it is mixed with fuel and burned to provide combustion gases 66. Subsequently, the combustion gases 66 are routed through the HP turbine 28 and the LP turbine 30, where a portion of thermal and/or kinetic energy from the combustion gases 66 is extracted.

The combustion gases 66 are then routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan engine 10, also providing propulsive thrust.

Further, the exemplary turbofan engine 10 includes a fuel delivery system 80 providing a flow of fuel to the combustion section 26 of the turbofan engine 10. The fuel delivery system 80 generally includes a fuel source 82 and a plurality of fuel lines 84. The fuel source 82 may be, e.g., a fuel tank positioned within a fuselage or one or more wings of an aircraft including the turbofan engine 10. Additionally, the one or more fuel lines 84 extend from the fuel source 82 to one or more fuel nozzles (not shown) within the combustion section 26.

Further, still, the exemplary turbofan engine 10 depicted includes a waste heat recovery system 86. As will be explained in greater detail below, the waste heat recovery system may generally be configured to extract heat from an airflow through the exhaust section 32 (and/or through sections of the turbine section) and provide such heat to one or both of the fuel delivery system 80 (such as to a fuel flow through the one or more fuel lines 84), the compressor section (such as a downstream end of the HP compressor 24), or both.

It should be appreciated, however, that the exemplary turbofan engine 10 depicted in FIG. 1 is by way of example only, and that in other exemplary embodiments, aspects of the present disclosure may additionally, or alternatively, be applied to any other suitable gas turbine engine. For example, in other exemplary embodiments, the turbofan engine 10 may include any suitable number of compressors, turbines (such as an intermediate turbine in addition to an LP and HP turbine), shafts/spools (e.g., one spool, two spools, three spools), etc. Further, in certain exemplary embodiments, aspects of the present disclosure may further apply to any other suitable aeronautical gas turbine engines, such as a turbojet engine, turboshaft engine, turboprop engine, etc. Additionally, in still other exemplary embodiments, the exemplary turbofan engine 10 may not be configured as an aeronautical gas turbine engine, and instead may be configured as an industrial gas turbine engine (e.g., utilized for power generation), a nautical gas turbine engine, etc.

Figure 2:
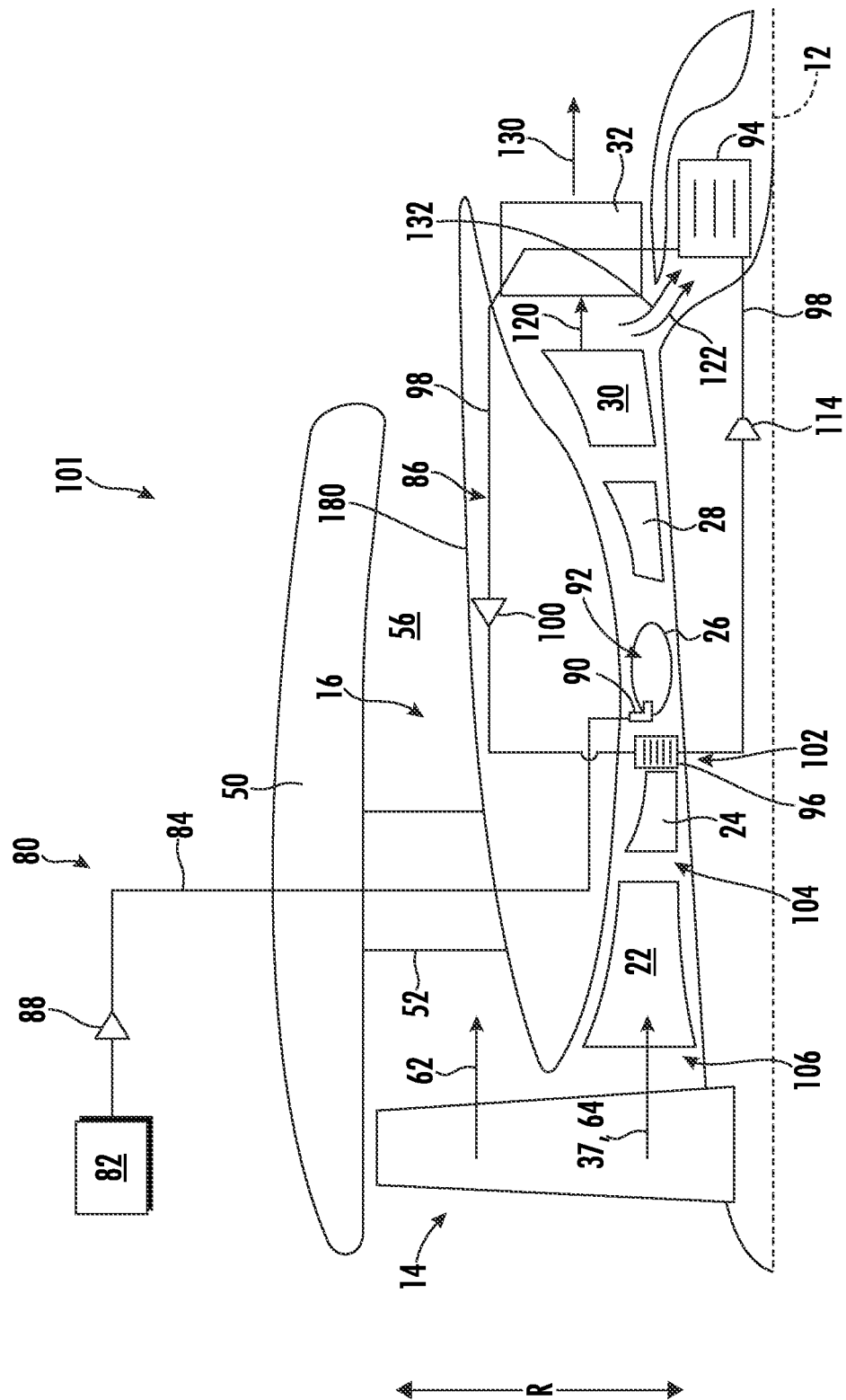
FIG. 2 is a simplified schematic view of a gas turbine engine and a waste heat recovery system in accordance with an exemplary embodiment of the present disclosure.

Referring now to FIG. 2, a simplified, schematic view of a gas turbine engine 101 in accordance with an exemplary aspect of the present disclosure is provided. The exemplary gas turbine engine 101 depicted in FIG. 2 may be configured in substantially the same manner as exemplary turbofan engine 10 described above with reference to FIG. 1.

For example, as is shown, the gas turbine engine 101 generally includes a fan section 14 and a turbomachine 16. The turbomachine 16 includes in serial flow order a compressor section having an LP compressor 22 and an HP compressor 24, a combustion section 26, a turbine section including an HP turbine 28 and an LP turbine 30, and an exhaust section 32. The compressor section, the combustion section 26, the turbine section, and the exhaust section 32 generally define a core air flowpath 37 extending therethrough.

A fuel delivery system 80 is also included for providing a flow of fuel to the combustion section 26 of the gas turbine engine 101, and more specifically to a combustion chamber 92 of the combustion section 26. For example, the fuel delivery system 80 generally includes a plurality of fuel lines 84 and a fuel nozzle 90. The fuel nozzle 90 may receive a flow of fuel from the plurality of fuel lines 84 and further may receive compressed air from the compressor section (e.g., the HP compressor 24). The fuel nozzle 90 may accordingly provide a mixture of compressed air and fuel to the combustion chamber 92, wherein such mixture of compressed air and fuel is combusted to generate combustion gasses. The fuel delivery system 80 generally also includes a fuel source 82 and a pump 88 in fluid communication with the one or more fuel lines 84, the pump 88 configured for increasing a pressure of a fuel flow from the fuel source 82 and through the one or more fuel lines 84.

Moreover, the turbomachine 16 and fan section 14 are at least partially surrounded by an outer nacelle 50, with the turbomachine 16 supported relative to the outer nacelle 50 through a plurality of outlet guide vanes 52. The outer nacelle 50 defines a bypass airflow passage 56 with the turbomachine 16. A first portion 62 of the airflow from the fan section 14 is provided through the bypass airflow passage 56 as a bypass airflow and a second portion 64 of an airflow from the fan section 14 is provided through the turbomachine 16 as a core airflow.

In addition, the exemplary gas turbine engine 101 includes a waste heat recovery system 86. The exemplary waste heat recovery system 86 is generally configured to extract heat from a heat source (e.g., a heat source not fully utilizing the heat being extracted therefrom) and transfer such extracted heat to a heat sink, such that the heat sink may more efficiently utilize such extracted heat.

Referring particularly to the exemplary waste heat recovery system 86 depicted in FIG. 2, the waste heat recovery system 86 includes a primary exhaust flowpath 120 and a waste heat recovery flowpath 122 that is parallel to the primary exhaust flowpath 120. Additionally, the waste heat recovery system 86 also includes a heat source exchanger 94 (i.e., a heat exchanger configured to extract heat for the waste heat recovery system 86 from a heat source of the gas turbine engine 101), a heat sink exchanger 96 (i.e., a heat exchanger configured to transfer heat from the waste heat recovery system 86 to a heat sink of the gas turbine engine 101), a thermal transfer bus 98, and a pump 100. Each of these components are described in greater detail as follows.

For the embodiment shown, the heat source exchanger 94 is in thermal communication with the heat source, which may generally be the turbine section, e.g., which may include the HP turbine 28 and the LP turbine 30, and the exhaust section 32, or both. For example, for the embodiment of FIG. 2, the heat source includes an airflow exiting the turbine section, e.g., which may include the HP turbine 28 and the LP turbine 30. A first portion of the airflow 130 that exits the turbine section, e.g., which may include the HP turbine 28 and the LP turbine 30, travels through the primary exhaust flowpath 120 and a second portion of the airflow 132 that exits the turbine section, e.g., which may include the HP turbine 28 and the LP turbine 30, is directed to the waste heat recovery flowpath 122. As shown in FIG. 2, the heat source exchanger 94 is positioned in thermal communication with the waste heat recovery flowpath 122, and more specifically for the embodiment depicted is positioned within the waste heat recovery flowpath 122. For example, the heat source exchanger 94 may be integrated into a portion of the waste heat recovery flowpath 122 or alternatively may be positioned at any other suitable location in thermal communication with an airflow directed through the waste heat recovery flowpath 122.

Moreover, for the exemplary embodiment depicted, the heat sink exchanger 96 is in thermal communication with the heat sink, which may generally be the compressor section, the fuel delivery system 80, or both. More specifically, for the embodiment depicted, the heat sink exchanger 96 is in thermal communication with the compressor section at a location proximate a downstream end of the compressor section, or more specifically still with a location proximate a downstream end of the HP compressor 24 of the compressor section. It will be appreciated, that as used herein, the term "proximate the downstream end," with reference to the compressor section refers to a location closer to an exit of the compressor section than an inlet to the compressor section and upstream of the combustion chamber 92. Similarly, as used herein, the term "proximate the downstream end," with reference to the HP compressor 24 refers to a location closer to an exit 102 of the HP compressor 24 than an inlet 104 to the HP compressor 24 and upstream of the combustion chamber 92. For example, in certain embodiments, the heat sink exchanger 96 may be integrated into, or coupled to, a strut or guide vane, such as a diffuser, positioned at the compressor exit 102 and upstream of the combustion chamber 92 of the combustion section 26. Additionally, or alternatively, the heat sink exchanger 96 may be integrated into, or coupled to, one or more fuel nozzles 90 of the fuel delivery system 80.

More specifically still, for the embodiment shown, the heat sink exchanger 96 is in thermal communication with the exit 102 of the HP compressor 24 of the gas turbine engine 101. The "compressor exit" refers to an outlet of the HP compressor 24. In such a manner, the heat sink exchanger 96 may add heat to an airflow through the core air flowpath 37 prior to such airflow entering the combustion chamber 92, resulting in a more efficient gas turbine engine 101.

Further, as stated, the waste heat recovery system 86 includes the thermal transfer bus 98. The thermal transfer bus 98 includes a thermal transfer fluid and extends from the heat source exchanger 94 to the heat sink exchanger 96. In such a manner, the thermal bus is configured to transfer the thermal transfer fluid from the heat source exchanger 94 (wherein the thermal transfer fluid has accepted heat from a portion of the airflow exiting the turbine section, e.g., which may include the HP turbine 28 and the LP turbine 30, directed to the waste heat recovery flowpath 122) to the heat sink exchanger 96 (wherein the thermal transfer fluid transfers heat to the airflow through, for the embodiment shown, the compressor exit 102 of the HP compressor 24, or other location upstream of the combustion chamber 92). The thermal transfer bus 98 may include one or more pipes, conduits, etc. arranged in series, parallel, or some combination thereof.

Notably, in at least certain exemplary embodiments the gas turbine engine 101 may define a relatively high overall pressure ratio. As used herein, the term overall pressure ratio refers to a ratio of a pressure of the air through the turbomachine 16 at an outlet of the compressor section (i.e., the exit 102 of the HP compressor 24 for the embodiment shown) to a pressure of the air through the turbomachine 16 at an inlet of the compressor section (i.e., an inlet 106 of the LP compressor 22 for the embodiment shown). In at least certain exemplary embodiments, the overall pressure ratio of the gas turbine engine 101 depicted in FIG. 2 may be at least about 25. For example, in certain exemplary embodiments, the overall pressure ratio of the gas turbine engine 101 depicted in FIG. 2 may be at least about 28, such as at least about 30, such as at least about 32, such as up to about 75. Given the relatively high overall pressure ratio of the exemplary gas turbine engine 101 depicted, it will be appreciated that a temperature of the airflow through the exhaust section 32 of the gas turbine engine 101 may be less than a temperature of the airflow through the downstream end of the compressor section, such as the downstream end of the HP compressor 24, such as the compressor exit 102 of the HP compressor 24.

In exemplary embodiments, in order to allow the exemplary waste heat recovery system 86 depicted in FIG. 2 to transfer heat from the heat source/–heat source exchanger 94 to the heat sink/–heat sink exchanger 96, the exemplary waste heat recovery system 86 further includes the pump 100 in fluid communication with the thermal transfer bus 98 downstream of the heat source exchanger 94 and upstream of the heat sink exchanger 96 for increasing a temperature and a pressure of the thermal transfer fluid in the thermal transfer bus 98. For example, in certain exemplary embodiments, the pump 100 may be configured to provide at least about a twenty-five pounds per square inch ("psi") pressurize rise, such as at least about a fifty psi of pressurize rise, such as at least about a one hundred psi of pressurize rise, such as up to about five thousand psi pressure rise, in the thermal transfer fluid through the thermal transfer bus 98, and similarly may be configured to provide at least about one hundred and fifty (150) degrees Celsius temperature rise, such as at least about two hundred and fifty (250) degrees Celsius temperature rise, and up to about one thousand (1,000) degrees Celsius temperature rise, in the thermal transfer fluid through the thermal transfer bus 98. The pump 100 may be powered through, e.g., one or more of the shafts or spools of the gas turbine engine 101, or alternatively may be powered by an electric motor, hydraulic motor, pneumatic motor, or any other suitable power source. It will be appreciated, however, that in other exemplary embodiments, the pump 100 may have any other suitable configuration. For example, in other embodiments, the pump 100 may be configured to create any other suitable temperature and/or pressure rise, or some other suitable device or configuration may be provided to increase a temperature and/or pressure of the thermal fluid through the thermal transfer bus 98 and provide for the flow of thermal fluid through the thermal transfer bus 98. It is also contemplated that a waste heat recovery system of the present disclosure may include other fluid motive devices, gas motive devices, or other similar flow components that could be used instead of a pump, for example, compressors, etc.

Referring to FIG. 2, it will be appreciated that the exemplary thermal transfer bus 98 is a closed loop thermal transfer bus 98 further extending from the heat sink exchanger 96 back to the heat source exchanger 94. Further, for the embodiment shown, the exemplary waste heat recovery system 86 further includes an expansion device in fluid communication with the thermal transfer bus 98 downstream of the heat sink exchanger 96 and upstream of the heat source exchanger 94. The expansion device may be any suitable expansion device. For example, for the embodiment shown, the expansion device is configured as a turbine 114 in fluid communication with the thermal transfer bus 98 downstream of the heat sink exchanger 96 and upstream of the heat source exchanger 94. With such an embodiment, the turbine 114 may extract additional energy from the thermal transfer fluid, increasing an efficiency of the waste heat recovery system 86 and gas turbine engine 101. As will be appreciated, inclusion of the expansion device may generally allow for the reduction of a temperature of the thermal transfer fluid to a relatively low temperature such that the thermal transfer fluid may accept heat from the heat source through the heat source exchanger 94. For example, the expansion device may reduce a temperature of the thermal transfer fluid at least about one hundred degrees Celsius, such as at least about one hundred and fifty degrees Celsius, such as up to about 1,000 degrees Celsius.

However, in other embodiments, the expansion device may not be configured to extract additional work from the thermal transfer fluid, and instead may simply be configured to expand the thermal transfer fluid (e.g., through an increasing cross-sectional area) to reduce a temperature and pressure of the thermal transfer fluid. Further, although the expansion device/-turbine 114 is depicted schematically inward of the core air flowpath 37 along a radial direction R of the gas turbine engine 101 of FIG. 2, in other embodiments, the expansion device/-turbine 114 may instead be positioned outward of the core air flowpath 37 along the radial direction R and within a cowling 180 of the turbomachine 16, or elsewhere.

In one or more these embodiments, the thermal transfer fluid may be a single phase thermal transfer fluid during operation of the waste heat recovery system 86. In such a manner, the thermal transfer fluid may remain in substantially a liquid phase during operation. Alternatively, the thermal transfer fluid may be a phase change thermal transfer fluid during operation of the waste heat recovery system 86. For example, the waste heat recovery system 86 may generally operate on a refrigeration cycle, such that the thermal transfer fluid changes between liquid and gaseous phases during operation of the waste heat recovery system 86, or as part of a power generation cycle, where waste heat recovery adds thermal energy to a power generation system, is expanded to produce power and then cooled by a turbomachine heat exchanger, and then is pumped through the cycle again (such cycles may also reverse the cooling and expansion process depending on temperatures). Additionally, or alternatively still, in one or more these configurations, the thermal transfer fluid may be in a supercritical phase during one or more stages of operation, or during all operations. For example, the thermal transfer fluid may be a supercritical $CO_2$ during certain operations or all operations of the waste heat recovery system 86.

It will be appreciated, however, that the exemplary gas turbine engine 101 and waste heat recovery system 86 depicted in FIG. 2 is provided by way of example only. In other embodiments, the waste heat recovery system 86 may have any other suitable configuration. For example, referring now to FIG. 3, a gas turbine engine 103 including a waste heat recovery system 86 in accordance with another exemplary embodiment of the present disclosure is depicted. The exemplary gas turbine engine 103 and waste heat recovery system 86 of FIG. 3 may be configured in substantially the same manner as exemplary gas turbine engine 101 and waste heat recovery system 86 of FIG. 2.

Figure 3:
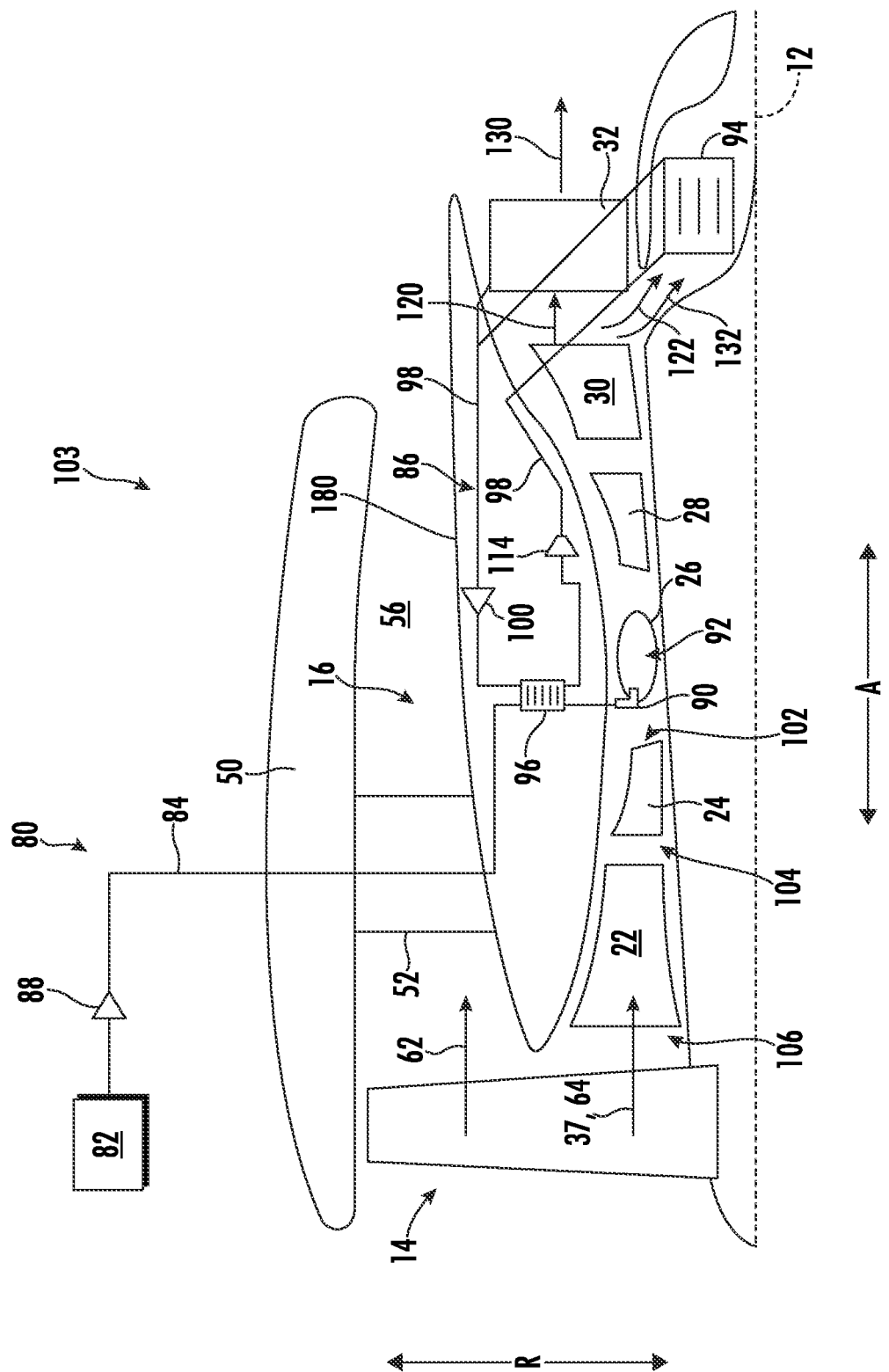
FIG. 3 is a simplified schematic view of a gas turbine engine and a waste heat recovery system in accordance with another exemplary embodiment of the present disclosure.

For example, the exemplary waste heat recovery system 86 of FIG. 3 includes a primary exhaust flowpath 120 and a waste heat recovery flowpath 122 that is parallel to the primary exhaust flowpath 120. Additionally, the waste heat recovery system 86 also includes a heat source exchanger 94, a heat sink exchanger 96, a thermal transfer bus 98 extending from the heat source exchanger 94 to the heat sink exchanger 96, and a pump 100 in fluid communication with the thermal transfer bus 98.

For the embodiment shown, the heat source exchanger 94 is in thermal communication with the heat source, which may generally be the turbine section, e.g., which may include the HP turbine 28 and the LP turbine 30, and the exhaust section 32, or both. For example, for the embodiment of FIG. 3, the heat source includes an airflow exiting the turbine section, e.g., which may include the HP turbine 28 and the LP turbine 30. A first portion of an airflow 130 that exits the turbine section, e.g., which may include the HP turbine 28 and the LP turbine 30, travels through the primary exhaust flowpath 120 and a second portion of an airflow 132 that exits the turbine section, e.g., which may include the HP turbine 28 and the LP turbine 30, is directed to the waste heat recovery flowpath 122. As shown in FIG. 3, the heat source exchanger 94 is disposed within and in thermal communication with the waste heat recovery flowpath 122. For example, the heat source exchanger 94 may be integrated into a portion of the waste heat recovery flowpath 122 or alternatively may be positioned at any other suitable location in thermal communication with an airflow directed through the waste heat recovery flowpath 122. However, for the exemplary embodiment of FIG. 3, the heat sink exchanger 96 is in thermal communication with a fuel delivery system 80 of the gas turbine engine 103. As used herein, a heat source exchanger 94 being in thermal communication with a heat source is understood to include all heat transfer modes, for example, heat through convection, thermal conduction, and thermal radiation from engine sections to the waste heat recovery system 86.

Notably, it will be appreciated that in certain exemplary embodiments, the fuel delivery system 80 may additionally be utilized as a heat sink for other systems of the gas turbine engine 103. As such, the fuel flow through the fuel delivery system 80 (or other component of the fuel delivery system 80 being utilized as the heat sink) may already be at a relatively high temperature prior to interacting with the heat sink exchanger 96 of the waste heat recovery system 86. In such a manner, it will be appreciated that, in at least certain exemplary aspects, the fuel delivery system 80 may define a reference point at which the heat sink exchanger 96 is thermally coupled to the fuel delivery system 80, and may further define a sink reference temperature at, or immediately upstream of, the reference point. The reference point may be within a fuel line 84 of the fuel delivery system 80, on a fuel nozzle 90 of the fuel delivery system 80, etc. Similarly, the turbine section, e.g., which may include the HP turbine 28 and the LP turbine 30, may define a source reference temperature at a location at, or immediately upstream of where the heat source exchanger 94 is thermally coupled to the turbine section and the exhaust section 32 (a location within the LP turbine 30 for the embodiment depicted). The relationship of a source reference temperature and sink reference temperature for the embodiment of FIG. 3 may be similar to the relationship between a source reference temperature and sink reference temperature for the embodiment described above with reference to FIG. 2. However, as with the embodiment described above, given the inclusion of the pump 100 in the thermal transfer bus 98, the waste heat recovery system 86 may still be capable of extracting heat from the turbine section and exhaust section 32 and transferring such heat to a higher temperature location where such heat may be utilized more efficiently.

It will further be appreciated that in still other exemplary embodiments, other suitable configurations may be provided.

Figure 4:
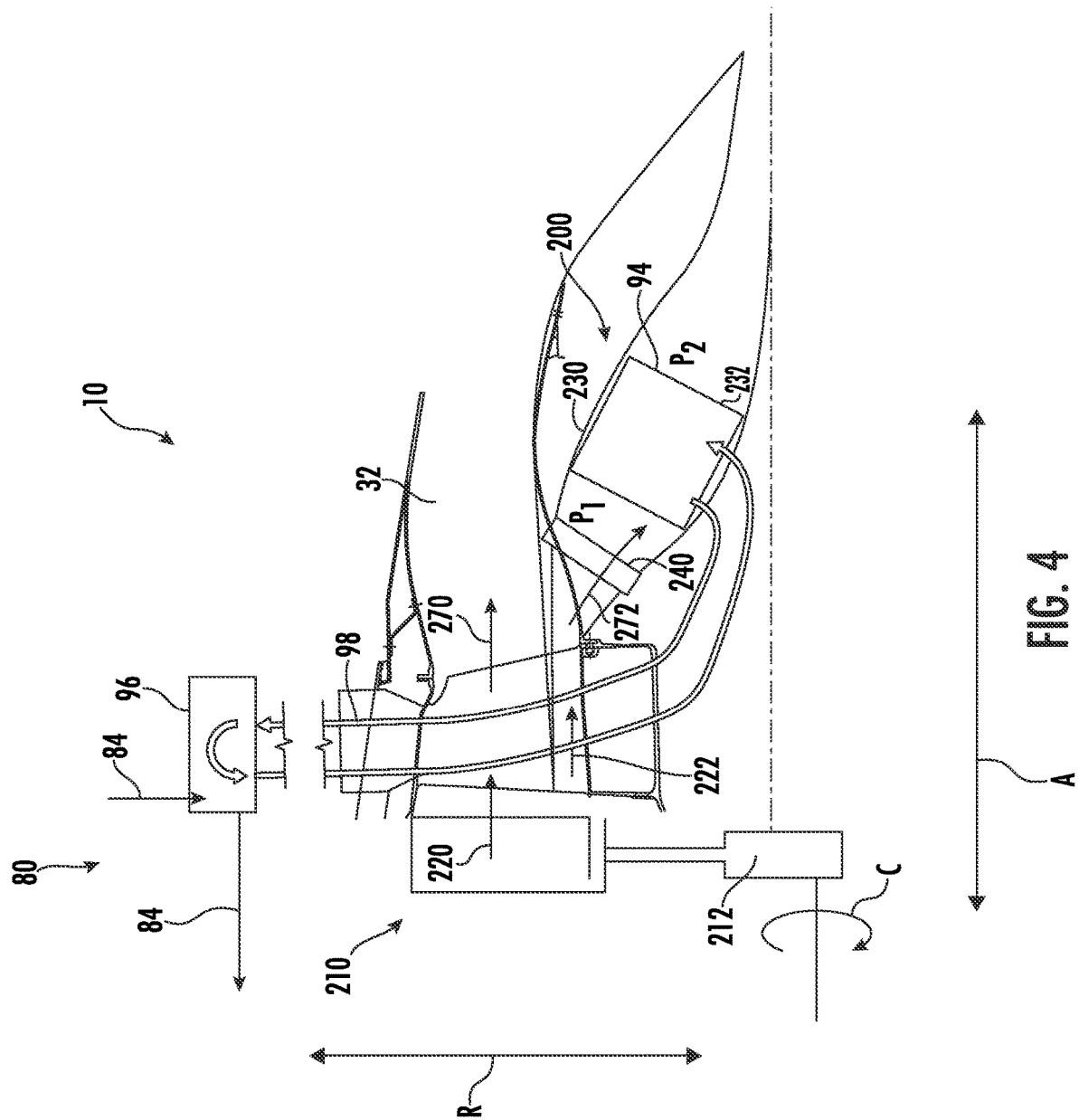
FIG. 4 is a simplified schematic view of a gas turbine engine and a waste heat recovery system in accordance with an exemplary embodiment of the present disclosure.
Figure 5:
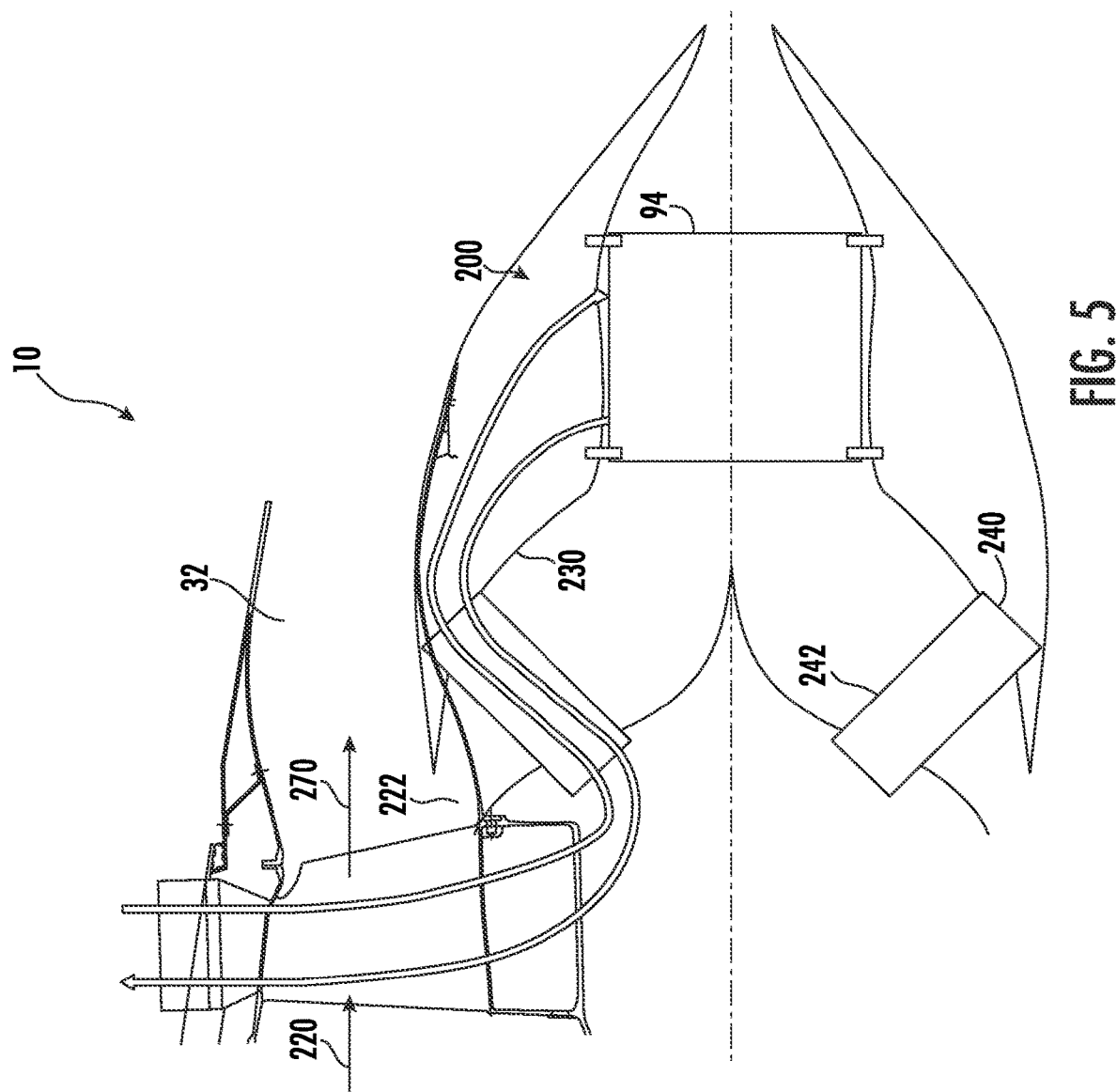
FIG. 5 is a simplified schematic view of a gas turbine engine and a waste heat recovery system in accordance with another exemplary embodiment of the present disclosure.
Figure 6:
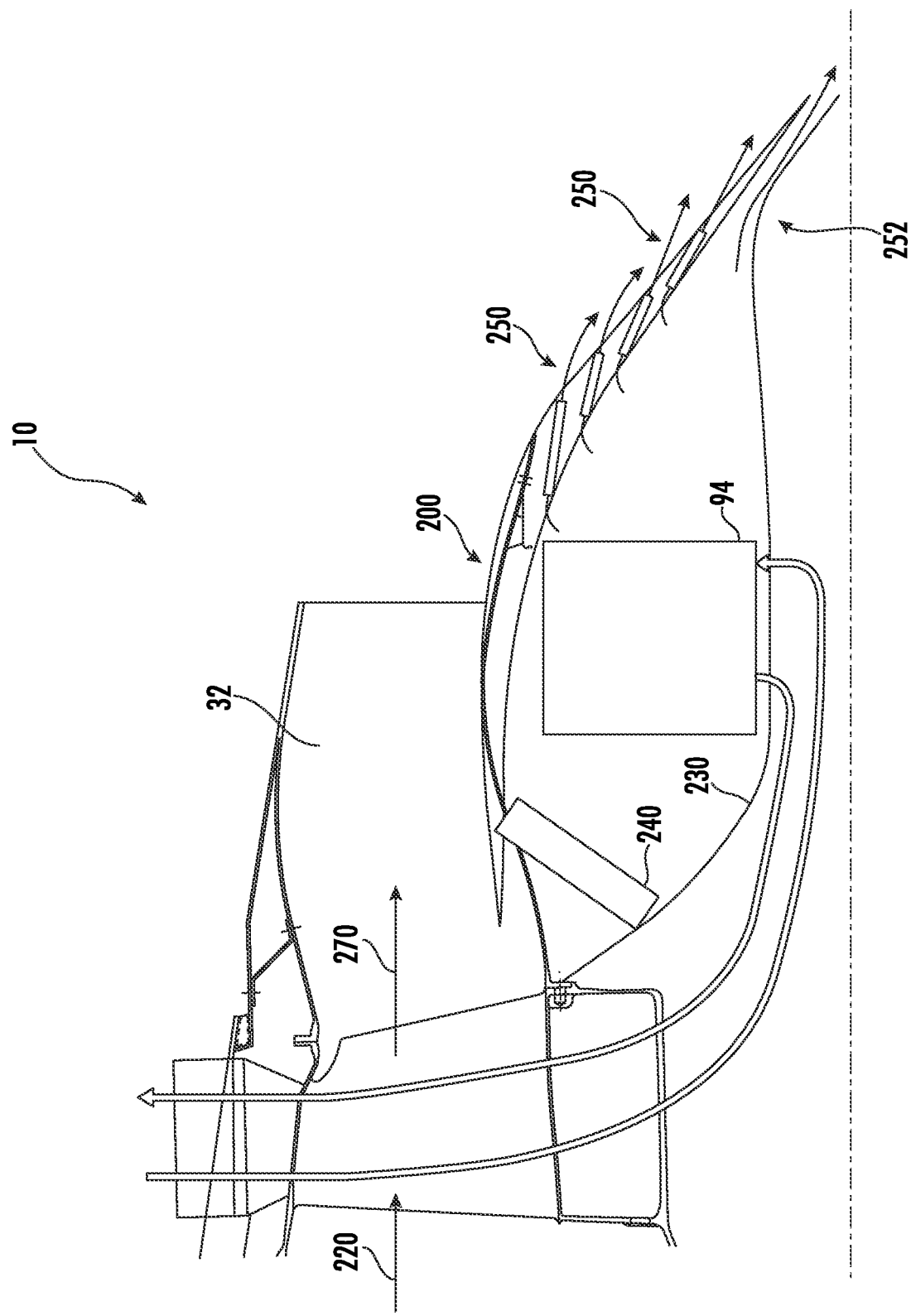
FIG. 6 is a simplified schematic view of a gas turbine engine and a waste heat recovery system in accordance with another exemplary embodiment of the present disclosure.

Referring now generally to FIGS. 4 through 6, simplified schematic views of gas turbine engines and waste heat recovery systems 200 in accordance with various exemplary embodiments of the present disclosure are provided. The exemplary gas turbine engines and waste heat recover systems 200 of FIGS. 4 through 6 may be configured in a similar manner as the exemplary gas turbine engines and waste heat recover systems described above with respect to FIGS. 1 through 3.

For example, in the exemplary embodiments depicted in FIGS. 4 through 6, the exemplary waste heat recovery systems 200 include a primary exhaust flowpath 220 and a waste heat recovery flowpath 222 that is parallel to the primary exhaust flowpath 220. As shown in FIGS. 4 through 6, the waste heat recovery flowpaths 222 are inward of the primary exhaust flowpaths 220, each in a radial direction R of the respective gas turbine engine. In exemplary embodiments, the primary exhaust flowpath 220 and the waste heat recovery flowpath 222 are located within the exhaust section 32 (FIG. 1) of the respective gas turbine engine, which may be configured in a similar manner to the exemplary turbofan engines 10 of FIGS. 1 through 3.

In exemplary embodiments, referring still to FIGS. 4 through 6, the waste heat recovery flowpath 222 is defined within a tail cone section 230 of the respective gas turbine engine 10 (FIG. 1). In such embodiments, a heat source exchanger 94 (i.e., a heat exchanger configured to extract heat for the waste heat recovery system 200 from a heat source of the gas turbine engine 10) is disposed within and in thermal communication with the respective waste heat recovery flowpath 222.

Referring specifically to FIG. 4, the heat source includes an airflow exiting a turbine section 210. In exemplary embodiments, it is contemplated that the turbine section 210 will include a last rotating stage 212 and the waste heat recovery system 200 will be aft of/–downstream of the last rotating stage 212 of the turbine section 210. A first portion of the airflow 270 that exits the turbine section 210 travels through the primary exhaust flowpath 220 and a second portion of the airflow 272 that exits the turbine section 210 is directed to the waste heat recovery flowpath 222. As shown in FIG. 4, the heat source exchanger 94 is disposed within and in thermal communication with the waste heat recovery flowpath 222. For example, the heat source exchanger 94 may be integrated into a portion of the waste heat recovery flowpath 222 or alternatively may be positioned at any other suitable location in thermal communication with an airflow directed through the waste heat recovery flowpath 222.

In exemplary embodiments, the second portion of the airflow that exits the turbine section 210 and is directed to the waste heat recovery flowpath 222 is between 1% and 50% of a total airflow that exits the turbine section 210. In exemplary embodiments, the second portion of the airflow that exits the turbine section 210 and is directed to the waste heat recovery flowpath 222 is between 1% and 40% of a total airflow that exits the turbine section 210. In exemplary embodiments, the second portion of the airflow that exits the turbine section 210 and is directed to the waste heat recovery flowpath 222 is between 1% and 30% of a total airflow that exits the turbine section 210. In exemplary embodiments, the second portion of the airflow that exits the turbine section 210 and is directed to the waste heat recovery flowpath 222 is between 1% and 25% of a total airflow that exits the turbine section 210. In certain exemplary embodiments, the second portion of the airflow that exits the turbine section 210 and is directed to the waste heat recovery flowpath 222 is between 5% and 20% of a total airflow that exits the turbine section 210. In certain exemplary embodiments, the second portion of the airflow that exits the turbine section 210 and is directed to the waste heat recovery flowpath 222 is between 5% and 15% of a total airflow that exits the turbine section 210. In certain exemplary embodiments, the second portion of the airflow that exits the turbine section 210 and is directed to the waste heat recovery flowpath 222 is between 5% and 10% of a total airflow that exits the turbine section 210.

In this manner, a waste heat recovery pressure drop of the second portion of the airflow within the waste heat recovery flowpath 222 is greater than a primary exhaust pressure drop of the first portion of the airflow within the primary exhaust flowpath 220. For example, the present disclosure provides a more efficient waste heat recovery system capable of an allowable pressure drop through the heat source exchanger 94 of approximately 5% by directing a parallel stream, e.g., the second portion of the airflow 272 that exits the turbine section 210 is directed to the waste heat recovery flowpath 222, through the heat source exchanger 94. More specifically, by separating the airflow that exits the turbine section 210 into two parallel paths (one through the primary exhaust flowpath 220 and one through the waste heat recovery flowpath 222), a permissible pressure drop of the airflow through the waste heat recovery flowpath 222 may be relatively high (allowing for more efficient heat transfer within the waste heat recovery flowpath 222) without increasing an overall pressure drop of the airflow that exits the turbine section 210 beyond permissible levels.

It is contemplated that a waste heat recovery system 200 of the present disclosure is capable of an allowable pressure drop through the heat source exchanger 94 of approximately 0.1% to 25% by directing a parallel stream, e.g., the second portion of an airflow 272 that exits the turbine section 210, to the waste heat recovery flowpath 222 and through the heat source exchanger 94. It is further contemplated that a waste heat recovery system 200 of the present disclosure is capable of an allowable pressure drop through the heat source exchanger 94 of approximately 0.1% to 20% by directing a parallel stream, e.g., the second portion of an airflow 272 that exits the turbine section 210, to the waste heat recovery flowpath 222 and through the heat source exchanger 94. It is further contemplated that a waste heat recovery system 200 of the present disclosure is capable of an allowable pressure drop through the heat source exchanger 94 of approximately 0.1% to 15% by directing a parallel stream, e.g., the second portion of an airflow 272 that exits the turbine section 210, to the waste heat recovery flowpath 222 and through the heat source exchanger 94. It is further contemplated that a waste heat recovery system 200 of the present disclosure is capable of an allowable pressure drop through the heat source exchanger 94 of approximately 0.1% to 10% by directing a parallel stream, e.g., the second portion of the airflow 272 that exits the turbine section 210, to the waste heat recovery flowpath 222 and through the heat source exchanger 94. It is further contemplated that a waste heat recovery system 200 of the present disclosure is capable of an allowable pressure drop through the heat source exchanger 94 of approximately 0.1% to 8% by directing a parallel stream, e.g., the second portion of the airflow 272 that exits the turbine section 210, to the waste heat recovery flowpath 222 and through the heat source exchanger 94. It is contemplated that a waste heat recovery system 200 of the present disclosure is capable of an allowable pressure drop through the heat source exchanger 94 of approximately 0.1% to 6% by directing a parallel stream, e.g., the second portion of the airflow 272 that exits the turbine section 210, to the waste heat recovery flowpath 222 and through the heat source exchanger 94. It is also contemplated that a waste heat recovery system 200 of the present disclosure is capable of an allowable pressure drop through the heat source exchanger 94 of approximately 5% by directing a parallel stream, e.g., the second portion of the airflow 272 that exits the turbine section 210, to the waste heat recovery flowpath 222 and through the heat source exchanger 94.

Another advantage of directing a portion of a total airflow that exits the turbine section 210 to a heat source exchanger 94 disposed within and in thermal communication with the waste heat recovery flowpath 222 includes a greater area for the heat source exchanger 94. For example, referring to FIG. 5, the area of the waste heat recovery flowpath 222 is greater than the area of the primary exhaust flowpath 220. This increased area in the waste heat recovery flowpath 222 also leads to deceleration of the second portion of an airflow that exits the turbine section 210 and is directed through the waste heat recovery flowpath 222 and the heat source exchanger 94 which also improves the efficiency of the waste heat recovery system 200.

In an exemplary embodiment depicted in FIG. 4, the heat source exchanger 94 includes an annular ring heat exchanger 232 (e.g., extending substantially continuously in a circumferential direction C).

As described above with reference to FIG. 3 and now also referring to FIG. 4, the waste heat recovery system 200 is in communication with a fuel delivery system 80 for providing a flow of fuel via fuel lines 84 to the combustion section 26 (FIG. 3). For example, the waste heat recovery system 86 includes a thermal transfer bus 98, as described above, having a thermal transfer fluid and extending from a heat source exchanger 94 to the fuel delivery system 80 via the heat sink exchanger 96.

In exemplary embodiments, a thermal capacity ratio of the heat source exchanger 94 of the waste heat recovery system 200 is greater than 0.2. The thermal capacity ratio of the heat source exchanger 94 of the waste heat recovery system 200 is determined by Cmin-/-Cmax where Cmin is the lower value of m*cp and Cmax is the larger vale of m*cp between the two streams (where m is the mass flow rate of the fluid and cp is the fluid specific heat capacity). The thermal capacity ratio may be defined at an operating condition of the engine, such as at cruise.

In certain exemplary embodiments, a thermal capacity ratio of the heat source exchanger 94 of the waste heat recovery system 200 is greater than 0.2 and less than 1.0. In certain exemplary embodiments, a thermal capacity ratio of the heat source exchanger 94 of the waste heat recovery system 200 is greater than 0.2 and less than 0.95. In certain exemplary embodiments, a thermal capacity ratio of the heat source exchanger 94 of the waste heat recovery system 200 is greater than 0.5 and less than 1.0. In certain exemplary embodiments, a thermal capacity ratio of the heat source exchanger 94 of the waste heat recovery system 200 is greater than 0.5 and less than 0.95.

Referring now to FIG. 5, a simplified, schematic view of a gas turbine engine 10 in accordance with an exemplary aspect of the present disclosure is provided. The exemplary waste heat recovery system 200 depicted in FIG. 5 may be configured in substantially the same manner as exemplary waste heat recovery system 200 described above with reference to FIG. 4.

In the exemplary embodiment depicted in FIG. 5, the heat source exchanger 94 includes a block heat exchanger 234. In such an embodiment as shown in FIG. 5, the heat source exchanger 94 has a larger area within the waste heat recovery flowpath 222 to be positioned into and thus heat source exchangers 94 that are larger in size may be used within the waste heat recovery flowpath 222. In other exemplary embodiments, it is also contemplated that the heat source exchanger 94 may include a plurality of block heat exchangers.

Referring still to FIG. 5, in an exemplary embodiment, the tail cone section 230 includes a guide vane 240 for stabilizing the tail cone section 230. It is contemplated that the guide vane 240 could rotate between an open and closed position to control the flow of the second portion of the airflow that exits the turbine section 210 and is directed to the waste heat recovery flowpath 222. As such, the waste heat recovery system 200 includes a valve 242 that is disposed within a second portion of the waste heat recovery flowpath 222 spaced from a first portion of the waste heat recovery flowpath 222 containing the heat source exchanger 94. The valve 242 is transitionable between an open position in which the second portion of the airflow flows through the waste heat recovery flowpath 222 to the heat source exchanger 94 and a closed position in which the second portion of the airflow is restricted from the heat source exchanger 94. For example, when the valve 242 is in the closed position, a mass flowrate of the second portion of the airflow from the turbine section may be between 1% and 60% (such as less than 50%, such as less than 40%, such as less than 30%, such as less than 20%, such as less than 10%) of a mass flowrate of the second portion of the airflow from the turbine section when the valve 242 is in the open position. It is contemplated that the valve 242 may be a rotatable guide vane, a radially actuating door, or a translating sled that adjusts the parallel stream inlet flow area.

As described, in an exemplary embodiment, the valve 242 is a rotatable guide vane 240. It is also contemplated that other valving systems could be used to control the flow of the second portion of the airflow that exits the turbine section 210 and is directed to the waste heat recovery flowpath 222.

Although FIG. 5 just shows the flowpaths it can be appreciated that the exemplary waste heat recovery system 200 could also include components such as a center vent tube extending on or around the centerline through the heat exchanger 94 and downstream of the outlet.

Referring now to FIG. 6, a simplified, schematic view of a gas turbine engine 10 in accordance with an exemplary aspect of the present disclosure is provided. The exemplary waste heat recovery system 200 depicted in FIG. 6 may be configured in substantially the same manner as exemplary waste heat recovery system 200 described above with reference to FIG. 4.

In an exemplary embodiment depicted in FIG. 6, the waste heat recovery system 200 includes outlet portions 250 located at an exit end 252 of the tail cone section 230. In an exemplary embodiment, the outlet portions 250 may comprise a plurality of airfoils that define openings through which the airflow travels out at the exit end 252 of the tail cone section 230. The outlet portions 250 allow for some or all of the airflow exiting the heat source exchanger 94 to be discharged out of the exit end 252 of the tail cone section 230. In other exemplary embodiments, it is also contemplated that the outlet portions 250 may define holes, similar to airfoil cooling film holes, with an aerodynamically shaped inlet section and flow-guiding section to discharge the air approximately tangential to the external surface.

Figure 7:
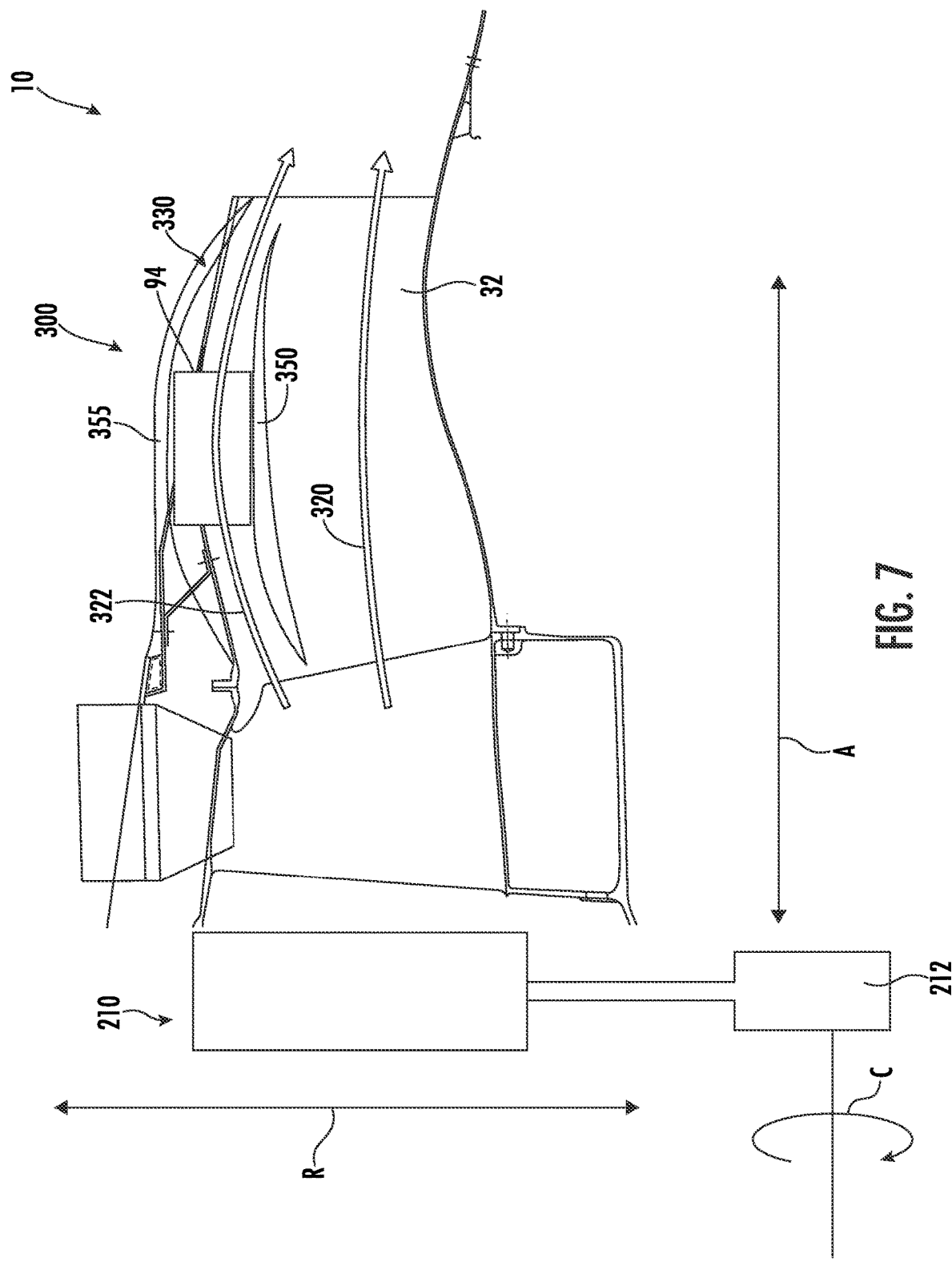
FIG. 7 is a simplified schematic view of a gas turbine engine and a waste heat recovery system in accordance with another exemplary embodiment of the present disclosure.
Figure 8:
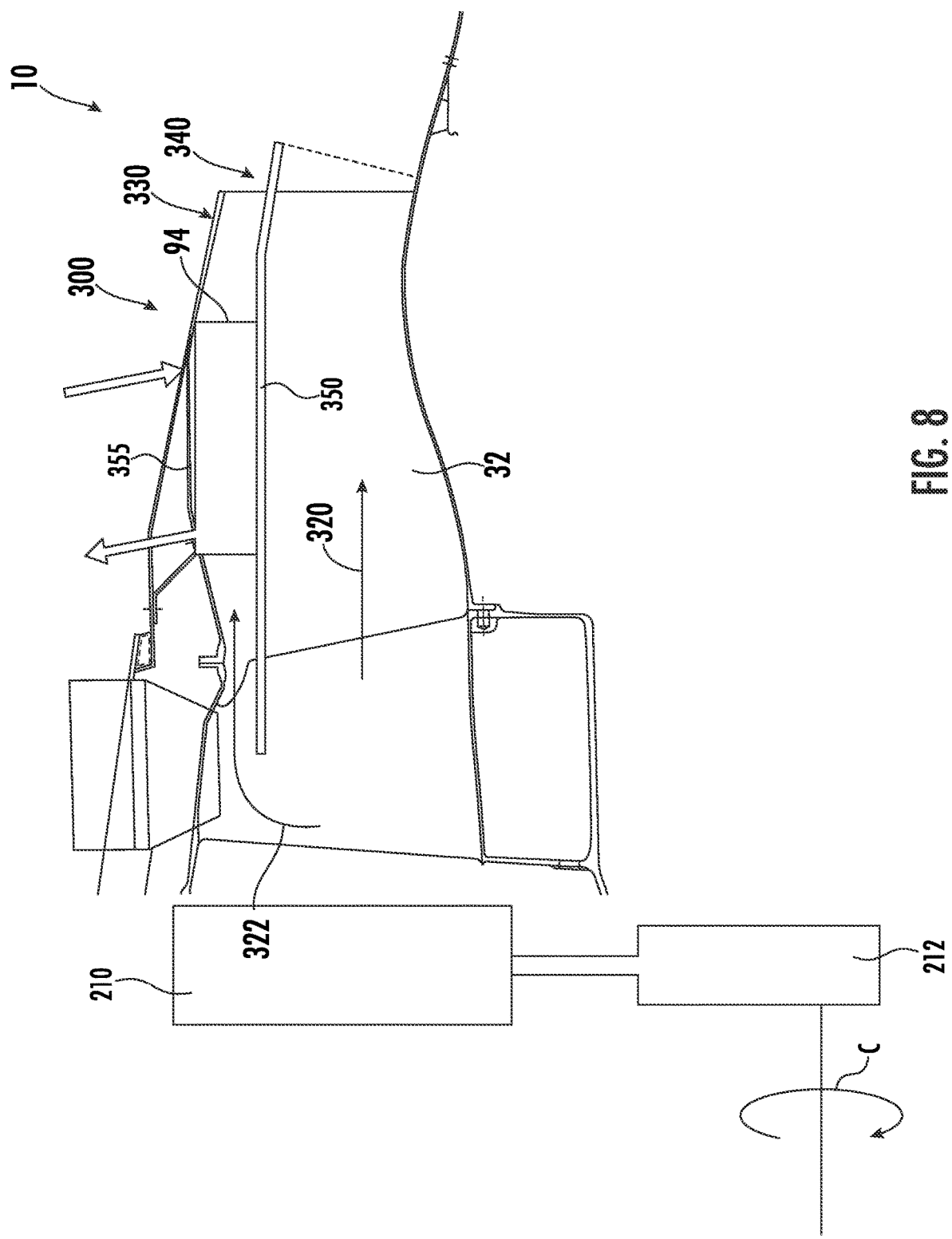
FIG. 8 is a simplified schematic view of a gas turbine engine and a waste heat recovery system in accordance with another exemplary embodiment of the present disclosure.

Referring now generally to FIGS. 7 and 8, in exemplary embodiments of the present disclosure, exemplary waste heat recovery systems 300 include a primary exhaust flowpath 320 and a waste heat recovery flowpath 322 that is parallel to the primary exhaust flowpath 320. As shown in FIGS. 7 and 8, the waste heat recovery flowpath 322 is defined by an outer band section 330 of the exhaust section 32 that is outward of the primary exhaust flowpath 320 in a radial direction R.

In particular, for the embodiments depicted, a divider wall 350 is disposed between and separates the primary exhaust flowpath 320 from the waste heat recovery flowpath 322 and an outer wall 355 is disposed outward from the divider wall 350 in the radial direction. In an exemplary embodiment, the divider wall 350 and the outer wall 355 extend generally along axial direction A. The waste heat recovery flowpath 322 is defined between the outer wall 355 and the divider wall 350. In exemplary embodiments, the heat source exchanger 94 may be coupled to one or both of these walls 350, 355.

In such embodiments, a heat source exchanger 94 (i.e., a heat exchanger configured to extract heat for the waste heat recovery system 300 from a heat source of the gas turbine engine 10) is disposed within and in thermal communication with the waste heat recovery flowpath 322. The heat source includes an airflow exiting a turbine section 210 as discussed in detail above with reference to FIG. 4. Other aspects of the exemplary waste heat recovery system 300 depicted in FIGS. 7 and 8 may be configured in substantially the same manner as exemplary waste heat recovery system 200 described above with reference to FIG. 4.

Referring to FIGS. 7 and 8, in exemplary embodiments, it is contemplated that the turbine section 210 will include a last rotating stage 212 and the waste heat recovery system 300 will be aft of the last rotating stage 212 of the turbine section 210. A first portion of an airflow that exits the turbine section 210 travels through the primary exhaust flowpath 320 and a second portion of an airflow that exits the turbine section 210 is directed to the waste heat recovery flowpath 322.

As shown in FIGS. 7 and 8, the heat source exchanger 94 is disposed within and in thermal communication with the waste heat recovery flowpath 322. For example, the heat source exchanger 94 may be integrated into a portion of the waste heat recovery flowpath 322 or alternatively may be positioned at any other suitable location in thermal communication with an airflow directed through the waste heat recovery flowpath 322.

Referring now particularly to FIG. 8, a simplified, schematic view of a gas turbine engine 10 in accordance with an exemplary aspect of the present disclosure is provided. In an exemplary embodiment depicted in FIG. 8, a portion of the waste heat recovery flowpath 322 is defined by a waste heat recovery nozzle 340. In certain exemplary embodiments, the waste heat recovery nozzle 340 and the second portion of an airflow that exits the turbine section 210 that is directed to the waste heat recovery flowpath 322 may be integrated with an undercowl cooling vent flow (not depicted).

Referring to FIG. 8, in exemplary embodiments, the waste heat recovery nozzle 340 extends 360 degrees. In other exemplary embodiments, the waste heat recovery nozzle 340 extends less than 360 degrees. In some exemplary embodiments, the waste heat recovery nozzle 340 is canted for a thrust vector (e.g., a mean direction of flow through the waste heat recovery nozzle 340 may not be parallel to a centerline axis of the turbofan engine 10).

Referring to FIG. 7, in an exemplary embodiment, the two streams, i.e., the primary exhaust flowpath 320 and the waste heat recovery flowpath 322, mix together before exiting a single nozzle. In such an embodiment, the primary exhaust flowpath 320 mixes with the waste heat recovery flowpath 322 in a mixing region downstream of the end of the divider wall 350. In such an embodiment, the divider wall 350 terminates before a mixing region in which the primary exhaust flowpath 320 mixes with the waste heat recovery flowpath 322 as shown in FIG. 7.

Referring to FIG. 8, in another exemplary embodiment, the two streams, i.e., the primary exhaust flowpath 320 and the waste heat recovery flowpath 322, do not mix together and each stream exits via a separate nozzle. In such an embodiment, the primary exhaust flowpath 320 exits a first nozzle and the waste heat recovery flowpath 322 exits a separate second nozzle. In such an embodiment, the divider wall 350 extends all the way to the exit nozzles to keep the streams separate.

Referring still to FIG. 8, in other exemplary embodiments, it is contemplated that the waste heat recovery system 300 may or may not include vents, e.g., undercowl cooling vent flow may or may not mix in. It is also contemplated that upstream on the core cowl another nozzle or vent may be included in the waste heat recovery system 300.

In exemplary embodiments, the second portion of the airflow that exits the turbine section 210 and is directed to the waste heat recovery flowpath 322 is between 1% and 50% of a total airflow that exits the turbine section 210. In exemplary embodiments, the second portion of the airflow that exits the turbine section 210 and is directed to the waste heat recovery flowpath 322 is between 1% and 40% of a total airflow that exits the turbine section 210. In exemplary embodiments, the second portion of the airflow that exits the turbine section 210 and is directed to the waste heat recovery flowpath 322 is between 1% and 30% of a total airflow that exits the turbine section 210. In exemplary embodiments, the second portion of the airflow that exits the turbine section 210 and is directed to the waste heat recovery flowpath 322 is between 1% and 25% of a total airflow that exits the turbine section 210. In certain exemplary embodiments, the second portion of the airflow that exits the turbine section 210 and is directed to the waste heat recovery flowpath 322 is between 5% and 20% of a total airflow that exits the turbine section 210. In certain exemplary embodiments, the second portion of the airflow that exits the turbine section 210 and is directed to the waste heat recovery flowpath 322 is between 5% and 15% of a total airflow that exits the turbine section 210. In certain exemplary embodiments, the second portion of the airflow that exits the turbine section 210 and is directed to the waste heat recovery flowpath 322 is between 5% and 10% of a total airflow that exits the turbine section 210.

In this manner, a waste heat recovery pressure drop of the second portion of the airflow within the waste heat recovery flowpath 322 is greater than a primary exhaust pressure drop of the first portion of the airflow within the primary exhaust flowpath 320. For example, the present disclosure provides a more efficient waste heat recovery system capable of an allowable pressure drop through the heat source exchanger 94 of approximately 5% by directing a parallel stream, e.g., the second portion of an airflow that exits the turbine section 210 is directed to the waste heat recovery flowpath 322, through the heat source exchanger 94.

It is contemplated that a waste heat recovery system 300 of the present disclosure is capable of an allowable pressure drop through the heat source exchanger 94 of approximately 0.1% to 25% by directing a parallel stream, e.g., the second portion of an airflow that exits the turbine section 210, to the waste heat recovery flowpath 322 and through the heat source exchanger 94. It is further contemplated that a waste heat recovery system 300 of the present disclosure is capable of an allowable pressure drop through the heat source exchanger 94 of approximately 0.1% to 20% by directing a parallel stream, e.g., the second portion of an airflow that exits the turbine section 210, to the waste heat recovery flowpath 322 and through the heat source exchanger 94. It is further contemplated that a waste heat recovery system 300 of the present disclosure is capable of an allowable pressure drop through the heat source exchanger 94 of approximately 0.1% to 15% by directing a parallel stream, e.g., the second portion of an airflow that exits the turbine section 210, to the waste heat recovery flowpath 322 and through the heat source exchanger 94. It is further contemplated that a waste heat recovery system 300 of the present disclosure is capable of an allowable pressure drop through the heat source exchanger 94 of approximately 0.1% to 10% by directing a parallel stream, e.g., the second portion of an airflow that exits the turbine section 210, to the waste heat recovery flowpath 322 and through the heat source exchanger 94. It is further contemplated that a waste heat recovery system 300 of the present disclosure is capable of an allowable pressure drop through the heat source exchanger 94 of approximately 0.1% to 8% by directing a parallel stream, e.g., the second portion of an airflow that exits the turbine section 210, to the waste heat recovery flowpath 322 and through the heat source exchanger 94. It is contemplated that a waste heat recovery system 300 of the present disclosure is capable of an allowable pressure drop through the heat source exchanger 94 of approximately 0.1% to 6% by directing a parallel stream, e.g., the second portion of an airflow that exits the turbine section 210, to the waste heat recovery flowpath 322 and through the heat source exchanger 94. It is also contemplated that a waste heat recovery system 300 of the present disclosure is capable of an allowable pressure drop through the heat source exchanger 94 of approximately 5% by directing a parallel stream, e.g., the second portion of an airflow that exits the turbine section 210, to the waste heat recovery flowpath 322 and through the heat source exchanger 94.

Figure 9:
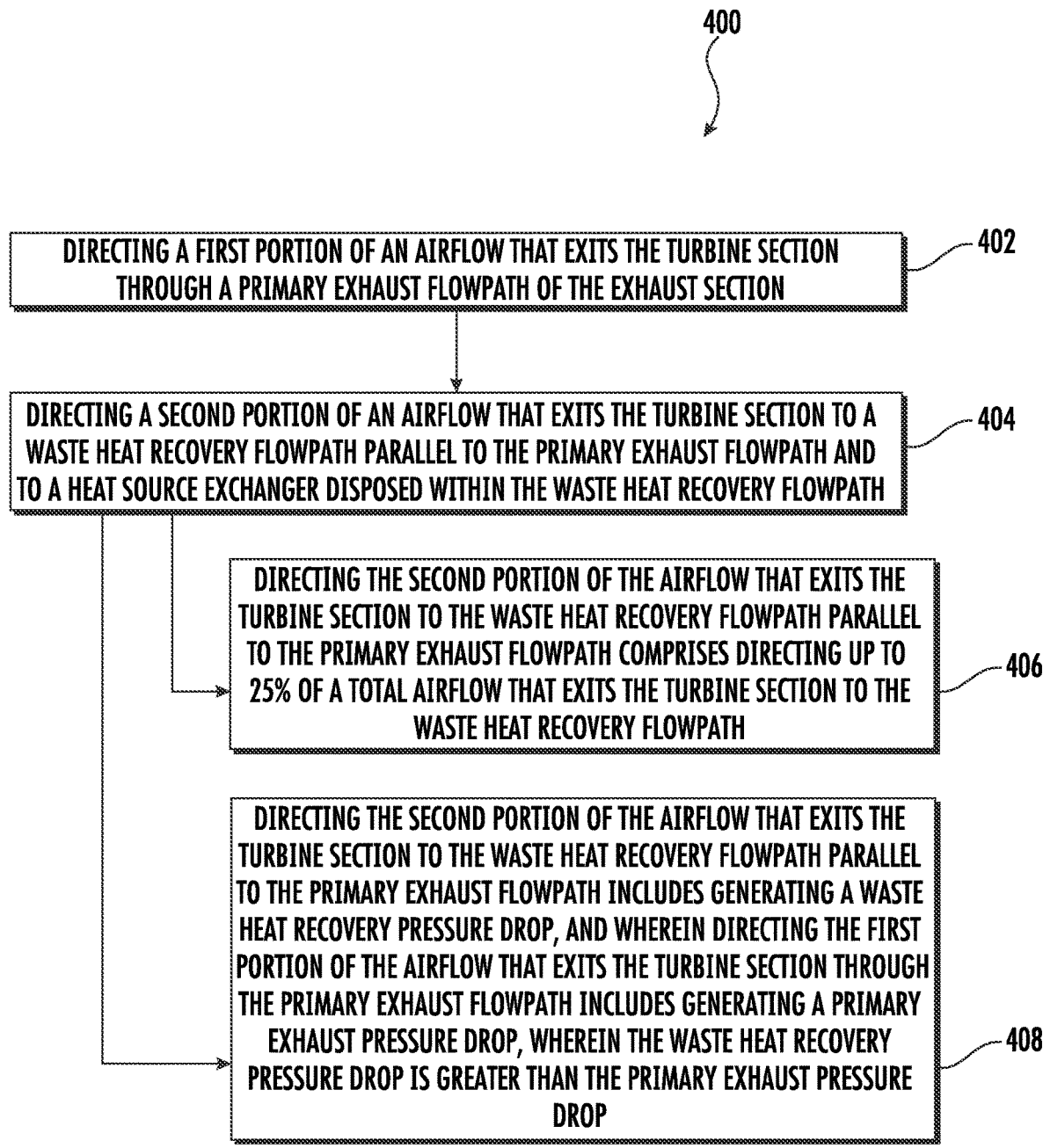
FIG. 9 is a flow diagram of a method for operating a gas turbine engine including a waste heat recovery system in accordance with the present disclosure.

Referring now to FIG. 9, a method 400 for operating a waste heat recovery system for a gas turbine engine having a compressor section, a combustion section, a turbine section, and an exhaust section in serial flow order and together defining a core air flowpath in accordance with an exemplary aspect of the present disclosure is provided. In certain exemplary aspects, the method 400 may be utilized with one or more of the exemplary gas turbine engines described above.

The method 400 includes at (402) directing a first portion of an airflow that exits the turbine section through a primary exhaust flowpath of the exhaust section as described in detail above with reference to FIGS. 1 through 8.

The method 400 further includes at (404) directing a second portion of an airflow that exits the turbine section to a waste heat recovery flowpath parallel to the primary exhaust flowpath and to a heat source exchanger disposed within the waste heat recovery flowpath as described in detail above with reference to FIGS. 1 through 8.

For the exemplary aspect depicted, the method 400 further includes at (406) directing the second portion of the airflow that exits the turbine section to the waste heat recovery flowpath parallel to the primary exhaust flowpath comprises directing up to 25% of a total airflow that exits the turbine section to the waste heat recovery flowpath as described in detail above with reference to FIGS. 1 through 8.

For the exemplary aspect depicted, the method 400 further includes at (408) directing the second portion of the airflow that exits the turbine section to the waste heat recovery flowpath parallel to the primary exhaust flowpath includes generating a waste heat recovery pressure drop, and wherein directing the first portion of the airflow that exits the turbine section through the primary exhaust flowpath includes generating a primary exhaust pressure drop, wherein the waste heat recovery pressure drop is greater than the primary exhaust pressure drop as described in detail above with reference to FIGS. 1 through 8.

Inclusion of a waste heat recovery system in accordance with one or more of these embodiments may generally allow for a more efficient gas turbine engine. More specifically, inclusion of a waste heat recovery system in accordance with one or more of these embodiments may generally allow for utilization of "waste heat" (i.e., heat that is not being utilized to provide work for the engine, or not efficiently being utilized to provide work for the engine) to increase an efficiency of the engine. For example, inclusion of a waste heat recovery system in accordance with one or more of these embodiments may allow for utilization of at least a portion of any heat remaining in, e.g., an exhaust of the engine to heat an airflow or fuel provided to the combustion chamber prior to such airflow or fuel being combusted. Such may generally result in a greater amount of energy generation through such combustion process, which may allow for the engine to extract an increased amount of work through the combustion process (resulting in a more efficient use of such extracted heat energy, and a more efficient gas turbine engine).

Further aspects of the disclosure are provided by the subject matter of the following clauses:

A gas turbine engine comprising: a compressor section, a combustion section, a turbine section, and an exhaust section in serial flow order and together defining a core air flowpath, the exhaust section including a primary exhaust flowpath and a waste heat recovery flowpath parallel to the primary exhaust flowpath; and a waste heat recovery system comprising a heat source exchanger positioned in thermal communication with a first portion of the waste heat recovery flowpath.

The gas turbine engine of any preceding clause, wherein a first portion of an airflow that exits the turbine section during operation of the gas turbine engine travels through the primary exhaust flowpath.

The gas turbine engine of any preceding clause, wherein a second portion of the airflow that exits the turbine section during operation of the gas turbine engine is directed to the waste heat recovery flowpath.

The gas turbine engine of any preceding clause, wherein the waste heat recovery flowpath is inward of the primary exhaust flowpath in a radial direction.

The gas turbine engine of any preceding clause, wherein the second portion of the airflow that exits the turbine section and is directed to the waste heat recovery flowpath is up to 25% of a total airflow that exits the turbine section.

The gas turbine engine of any preceding clause, wherein a waste heat recovery pressure drop of the second portion of the airflow within the waste heat recovery flowpath is greater than a primary exhaust pressure drop of the first portion of the airflow within the primary exhaust flowpath.

The gas turbine engine of any preceding clause, wherein the waste heat recovery system further comprises a valve disposed within a second portion of the waste heat recovery flowpath, wherein the valve is transitionable between an open position in which the second portion of the airflow flows to the heat source exchanger and a closed position in which the second portion of the airflow is restricted from the heat source exchanger.

The gas turbine engine of any preceding clause, wherein the valve comprises a rotatable guide vane.

The gas turbine engine of any preceding clause, wherein a thermal capacity ratio of the waste heat recovery system is greater than 0.2 during an operating condition of the gas turbine engine.

The gas turbine engine of any preceding clause, wherein the waste heat recovery flowpath is partially defined by a tail cone section of the gas turbine engine.

The gas turbine engine of any preceding clause, wherein the heat source exchanger comprises an annular ring heat exchanger.

The gas turbine engine of any preceding clause, wherein the heat source exchanger comprises a block heat exchanger.

The gas turbine engine of any preceding clause, wherein the waste heat recovery flowpath is defined at least in part by an outer band section of the exhaust section that is outward of the primary exhaust flowpath in a radial direction.

The gas turbine engine of any preceding clause, wherein the waste heat recovery system is aft of a last rotating stage of the turbine section.

The gas turbine engine of any preceding clause, wherein the heat source exchanger is positioned within the first portion of the waste heat recovery flowpath.

The gas turbine engine of any preceding clause, further comprising a fuel delivery system for providing a flow of fuel to the combustion section, wherein the waste heat recovery system further comprises a thermal transfer bus comprising a thermal transfer fluid and extending from the heat source exchanger to the fuel delivery system.

The gas turbine engine of any preceding clause, wherein the waste heat recovery system further comprises a pump in fluid communication with the thermal transfer bus downstream of the heat source exchanger for increasing a temperature and a pressure of the thermal transfer fluid in the thermal transfer bus.

A method for operating a waste heat recovery system for a gas turbine engine having a compressor section, a combustion section, a turbine section, and an exhaust section in serial flow order and together defining a core air flowpath, the method comprising: directing a first portion of an airflow that exits the turbine section through a primary exhaust flowpath of the exhaust section; and directing a second portion of the airflow that exits the turbine section to a waste heat recovery flowpath parallel to the primary exhaust flowpath and to a heat source exchanger disposed within the waste heat recovery flowpath.

The method of any preceding clause, wherein directing the second portion of the airflow that exits the turbine section to the waste heat recovery flowpath parallel to the primary exhaust flowpath comprises directing up to 25% of a total airflow that exits the turbine section to the waste heat recovery flowpath.

The method of any preceding clause, wherein directing the second portion of the airflow that exits the turbine section to the waste heat recovery flowpath parallel to the primary exhaust flowpath includes generating a waste heat recovery pressure drop, and wherein directing the first portion of the airflow that exits the turbine section through the primary exhaust flowpath includes generating a primary exhaust pressure drop, wherein the waste heat recovery pressure drop is greater than the primary exhaust pressure drop.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

While this disclosure has been described as having exemplary designs, the present disclosure can be further modified within the scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A gas turbine engine comprising:
   a compressor section, a combustion section, a turbine section, and an exhaust section in serial flow order and together defining a core air flowpath, the exhaust section including a primary exhaust flowpath and a waste heat recovery flowpath parallel to the primary exhaust flowpath; and
   a waste heat recovery system comprising a heat source exchanger positioned in thermal communication with a first portion of the waste heat recovery flowpath,
   wherein a first portion of an airflow that exits the turbine section during operation of the gas turbine engine travels through the primary exhaust flowpath, wherein a second portion of the airflow that exits the turbine section during operation of the gas turbine engine is directed to the waste heat recovery flowpath, wherein the waste heat recovery flowpath is inward of the primary exhaust flowpath in a radial direction, and wherein the waste heat recovery system further comprises a valve disposed within a second portion of the waste heat recovery flowpath, wherein the valve is transitionable between an open position in which the second portion of the airflow flows to the heat source exchanger and a closed position in which the second portion of the airflow is restricted from the heat source exchanger, and wherein the valve comprises a rotatable guide vane.

2. The gas turbine engine of claim 1, wherein the second portion of the airflow that exits the turbine section and is directed to the waste heat recovery flowpath is up to 25% of a total airflow that exits the turbine section.

3. The gas turbine engine of claim 1, wherein a waste heat recovery pressure drop of the second portion of the airflow within the waste heat recovery flowpath is greater than a primary exhaust pressure drop of the first portion of the airflow within the primary exhaust flowpath.

4. The gas turbine engine of claim 1, wherein a thermal capacity ratio of the waste heat recovery system is greater than 0.2 during an operating condition of the gas turbine engine.

5. The gas turbine engine of claim 1, wherein the waste heat recovery flowpath is partially defined by a tail cone section of the gas turbine engine.

6. The gas turbine engine of claim 5, wherein the heat source exchanger comprises an annular ring heat exchanger.

7. The gas turbine engine of claim 5, wherein the heat source exchanger comprises a block heat exchanger.

8. The gas turbine engine of claim 1, wherein the heat source exchanger is positioned within the first portion of the waste heat recovery flowpath.

9. The gas turbine engine of claim 1, further comprising a fuel delivery system for providing a flow of fuel to the combustion section, wherein the waste heat recovery system further comprises a thermal transfer bus comprising a thermal transfer fluid and extending from the heat source exchanger to the fuel delivery system.

10. The gas turbine engine of claim 9, wherein the waste heat recovery system further comprises a pump in fluid communication with the thermal transfer bus downstream of the heat source exchanger for increasing a temperature and a pressure of the thermal transfer fluid in the thermal transfer bus.

11. A gas turbine engine comprising:
a compressor section, a combustion section, a turbine section, and an exhaust section in serial flow order and together defining a core air flowpath, the exhaust section including a primary exhaust flowpath and a waste heat recovery flowpath parallel to the primary exhaust flowpath; and
a waste heat recovery system comprising a heat source exchanger positioned in thermal communication with a first portion of the waste heat recovery flowpath,
wherein the waste heat recovery flowpath is defined entirely between an outer wall of the exhaust section and a divider wall spaced radially inwardly from the outer wall, radially outwardly from an inner wall defining an inner barrier to the primary exhaust flowpath, wherein the divider wall is disposed within the primary exhaust flowpath,
wherein the waste heat recovery system is aft of a last rotating stage of the turbine section.

12. A gas turbine engine comprising:
a compressor section, a combustion section, a turbine section, and an exhaust section in serial flow order and together defining a core air flowpath, the exhaust section including a primary exhaust flowpath and a waste heat recovery flowpath parallel to the primary exhaust flowpath;
a waste heat recovery system comprising a heat source exchanger positioned in thermal communication with a first portion of the waste heat recovery flowpath, wherein the waste heat recovery flowpath is defined entirely between an outer wall of the exhaust section and a divider wall spaced radially inwardly from the outer wall, radially outwardly from an inner wall defining an inner barrier to the primary exhaust flowpath, wherein the divider wall is disposed within the primary exhaust flowpath; and
a fuel delivery system for providing a flow of fuel to the combustion section, wherein the waste heat recovery system further comprises a thermal transfer bus comprising a thermal transfer fluid and extending from the heat source exchanger to the fuel delivery system.

* * * * *